United States Patent
Talbot et al.

(10) Patent No.: US 9,655,299 B2
(45) Date of Patent: May 23, 2017

(54) ADJUSTABLE GUARD ASSEMBLY FOR A SICKLE KNIFE

(71) Applicant: MacDon Industries Ltd., Winnipeg (CA)

(72) Inventors: Francois R. Talbot, Winnipeg (CA); Rheal G. Remillard, St. Joseph (CA)

(73) Assignee: MacDon Industries Ltd., Winnipeg, MB (CA)

(*) Notice: Subject to any disclaimer, the term of this patent is extended or adjusted under 35 U.S.C. 154(b) by 288 days.

(21) Appl. No.: 13/680,557

(22) Filed: Nov. 19, 2012

(65) Prior Publication Data

US 2013/0305679 A1 Nov. 21, 2013

Related U.S. Application Data

(60) Provisional application No. 61/577,427, filed on Dec. 19, 2011.

(51) Int. Cl.
| | |
|---|---|
| A01D 34/02 | (2006.01) |
| A01D 34/13 | (2006.01) |
| A01D 34/16 | (2006.01) |
| A01D 34/18 | (2006.01) |

(52) U.S. Cl.
CPC .......... *A01D 34/13* (2013.01); *A01D 34/16* (2013.01); *A01D 34/18* (2013.01)

(58) Field of Classification Search
CPC ........ A01D 34/14; A01D 34/17; A01D 34/13; A01D 34/18
USPC ................. 56/257, 289, 296, 298, 299, 301, 56/307–311, DIG. 24
See application file for complete search history.

(56) References Cited

U.S. PATENT DOCUMENTS

| | | | |
|---|---|---|---|
| 621,562 A * | 3/1899 | Giffhorn | 56/305 |
| 3,314,222 A | 4/1967 | Scarnato | |
| 3,455,093 A * | 7/1969 | Stern | 56/305 |
| 3,490,215 A * | 1/1970 | Chapman et al. | 56/298 |
| 4,012,891 A * | 3/1977 | Steuerwald | 56/305 |
| 4,909,026 A | 3/1990 | Molzahn et al. | |
| 5,343,682 A * | 9/1994 | Puncochar | 56/305 |
| 6,305,154 B1 | 10/2001 | Yang et al. | |
| 7,275,358 B2 * | 10/2007 | Blakeslee et al. | 56/298 |
| 7,373,769 B2 * | 5/2008 | Talbot et al. | 56/303 |
| 2007/0107407 A1 * | 5/2007 | Blakeslee et al. | 56/307 |

* cited by examiner

*Primary Examiner* — Thomas B Will
*Assistant Examiner* — Mai Nguyen
(74) *Attorney, Agent, or Firm* — Adrian D. Battison; Ade & Company Inc.

(57) ABSTRACT

In a cutter bar having a upper and lower knife guards in cooperating pairs mounted on a support bar where each guard includes at least one point extending forwardly to define a channel therebetween in which the knife reciprocates, the upper knife guards are attached to an upper surface of the support bar by a compressible resilient pad between an under surface of the upper knife guard and the upper surface of the support bar, at least one hold down screw fastener engaged between the upper knife guard and the support bar which holds the upper knife guard on to the resilient pad and forms a fulcrum and at least one adjustment screw between the upper knife guard and the support bar behind the screw fastener so that adjustment of the screw increases an amount of compression of the compressible resilient pad.

3 Claims, 4 Drawing Sheets

ADJUSTABLE GUARD ASSEMBLY FOR A SICKLE KNIFE

This application claims the benefit under 35 USC 119(e) of Provisional Application 61/577,427 filed Dec. 19, 2011.

This invention relates to an adjustable guard assembly for the sickle knife of a crop cutting apparatus such as a swather or combine harvester.

BACKGROUND OF THE INVENTION

The cutting knife of a crop cutting apparatus of the type with which the present invention is concerned generally comprises a horizontal support bar or flange supported on the apparatus for movement across the ground in a cutting action. On the support bar is mounted a plurality of guards with one guard section clamped above the support bar as a hold down and the other guard section providing a ledger surface for the knife blades clamped below the support bar.

Generally each lower guard section is formed as an integral cast body defining a one, two, three or more of forwardly projecting fingers which are connected by transverse bars.

The lower guard section can be of the type known as a stub guard where the front edge of the guard terminates at a position just behind the front edge of the blade. In this case, typically each stub guard has the fingers of the upper stub guard cooperating with the fingers of the lower stub guard to define a channel across the front of the support bar within which a reciprocating knife is guided.

The lower guard section can also be of the type known as a pointed guard where the front edge of the guard extends forwardly from the front edge of the blade. In this case, the upper guard portion cooperating with the forwardly projecting portions of the lower stub guard may include a single hold down finger at one of the forwardly projecting portions or at a location between the portions.

In one possible arrangement, the pointed guards do not include a section, commonly known as a tang, which extends over the ledger surface. In this case the hold down can be aligned with one of the forwardly projecting portions of the lower guard.

To obtain a proper cutting action it is necessary to adjust the spacing between the upper hold down and the ledger surface of the lower guard to accurately confine the knife and cause a cutting action between the knife blades and machined ledger surfaces on the lower guards. The adjustment must be controlled within narrow tolerances to optimize the cutting action without providing excessive frictional engagement between the ledger surface of the lower guards and the knife in its reciprocating movement.

Conventionally this adjustment is provided by shims which are inserted between the hold down and the support bar. However this technique is an inaccurate, inconvenient and time consuming process which must be regularly repeated during routine maintenance of the equipment in view of wear which occurs between the knife arrangement and the stub guards.

One arrangement is shown in U.S. Pat. No. 4,909,026 of the present Assignees where the adjustment between the stub guards of a sickle knife arrangement of a crop cutting apparatus is improved by the provision of an adjustment plate which is positioned between the upper stub guard and the support bar. The upper and lower stub guards are clamped onto the support bar by carriage bolts with the lower stub guard engaging against the under surface of the support bar and the upper stub guard engaging against the upper surface of the adjustment plate. The spacing and orientation of the adjustment plate relative to the support bar is adjusted by the three set screws which are threaded into the adjustment plate and engaged against the upper surface of the support bar.

Also in U.S. Pat. No. 7,373,769 (Talbot) assigned to the present assignees is shown a wear shield for the cutter bar of a crop harvesting machine where the cutter bar includes a guard bar mounted on a front edge of the cutter bar, a plurality of cutter guards carried on mounting bolts at spaced positions along the guard bar and a ground engaging bottom plate on the cutter bar extending rearwardly from the guard bar.

All publications, patents, and patent applications mentioned in this specification are herein incorporated by reference to the same extent as if each individual publication, patent, or patent application was specifically and individually indicated to be incorporated by reference.

SUMMARY OF THE INVENTION

It is one object of the invention to provide an arrangement for adjusting the hold down of a guard arrangement for a sickle knife cutting arrangement.

According to one aspect of the invention there is provided a crop cutting apparatus comprising:

a forwardly facing support bar extending across the cutting apparatus so as to be carried for movement across the ground in a forward movement for cutting a standing crop;

the support bar having an upper surface and a lower surface;

a knife arrangement for reciprocating movement along the support bar including a plurality of blades thereon;

a plurality of lower knife guards clamped to the lower surface of the support bar at positions along the support bar;

each of the lower knife guards including at least one knife engaging element extending forwardly from the support bar with a ledger surface across the front of the support bar over which the knife arrangement reciprocates;

a plurality of upper hold down members mounted on the upper surface of the support bar and extending forwardly from the support bar for engaging the knife arrangement and for holding the knife arrangement against the ledge surface of the lower guards;

each of the hold down members being attached to the upper surface of the support bar by:

a compressible resilient pad between an under surface of the hold down member and the upper surface of the support bar;

at least one hold down screw fastener engaged between the hold down member and the support bar which holds the hold down member on to the resilient pad;

and at least one adjustment screw engaged between the hold down member and the support bar on a transverse line behind that of the hold down screw fastener;

the adjustment screw being adjustable to change the spacing between the under surface of the hold down member and the support bar at the adjustment screw so as to change the spacing between the under surface of the hold down member and the support bar at a side of the transverse line opposite to the adjustment screw by increasing or decreasing an amount of compression of the compressible resilient pad.

Preferably each of the hold down members comprises an upper knife guard arranged as a cooperating pair with a respective one of the lower knife guards, each upper knife guard including at least one knife engaging element extending forwardly from the support bar so that the or each knife engaging element of the upper knife guard overlies a corresponding knife engaging element of the lower knife guard to define a channel therebetween across the front of the support bar in which the knife arrangement reciprocates.

Preferably the upper knife guard has an equal number of knife engaging elements as the lower knife guard.

Preferably the upper knife guard and the lower knife guard form stub guards so that the knife blades project forwardly from a forward tip of the upper knife guard and the lower knife guard.

According to a second aspect of the invention there is provided a crop cutting apparatus comprising:

a forwardly facing support bar extending across the cutting apparatus so as to be carried for movement across the ground in a forward movement for cutting a standing crop;

the support bar having an upper surface and a lower surface;

a knife arrangement for reciprocating movement along the support bar including a plurality of blades thereon;

a plurality of lower knife guards clamped to the lower surface of the support bar at positions along the support bar;

each of the lower knife guards including at least one knife engaging element extending forwardly from the support bar with a ledger surface across the front of the support bar over which the knife arrangement reciprocates;

a plurality of upper hold down members mounted on the upper surface of the support bar and extending forwardly from the support bar for engaging the knife arrangement and for holding the knife arrangement against the ledge surface of the lower guards;

each of the hold down members being attached to the upper surface of the support bar by:
  a compressible resilient pad between an under surface of the hold down member and the upper surface of the support bar;
  at least one hold down screw fastener engaged between the hold down member and the support bar which holds the hold down member on to the resilient pad;
  and at least one adjustment screw engaged between the hold down member and the support bar on a transverse line behind that of the hold down screw fastener;

the adjustment screw being adjustable to change the spacing between the under surface of the hold down member and the support bar at the adjustment screw so as to change the spacing between the under surface of the hold down member and the support bar at a side of the transverse line opposite to the adjustment screw by increasing or decreasing an amount of compression of the compressible resilient pad.

In a typical arrangement each of the hold down members comprises an upper knife guard arranged as a cooperating pair with a respective one of the lower knife guards, each upper knife guard including at least one knife engaging element extending forwardly from the support bar so that the or each knife engaging element of the upper knife guard overlies a corresponding knife engaging element of the lower knife guard to define a channel therebetween across the front of the support bar in which the knife arrangement reciprocates. However the invention herein can also be used with pointed guards where a single hold down finger is used in cooperation with a series of forwardly projecting portions of the lower guards.

Preferably the upper knife guard has an equal number of knife engaging elements as the lower knife guard. However the invention can also be used with pointed guards where a portion of the lower guards projects forwardly from the tip of the blade.

Preferably the upper knife guard and the lower knife guard form stub guards so that the knife blades project forwardly from a forward tip of the upper knife guard and the lower knife guard.

Preferably the compressible resilient pad includes a bar extending along the support bar on the side of the transverse line opposite to the adjustment screw.

Preferably the compressible resilient pad also includes a ring portion thereof having a central hole located around the hold down screw fastener.

Preferably the compressible resilient pad is spaced from the adjustment screw so that the compressible resilient pad has less material on the side of the transverse line at the adjustment screw than on the opposite side.

While the compressible resilient pad may include positions on the side of the adjustment screw, preferably it consists essentially of the bar and the portion around the screw fastener.

Preferably the hold down screw fastener extends through the support bar and engages the lower knife guard to clamp the lower knife guard to the support bar.

Preferably the hold down screw fastener includes a nut on top of the support bar to clamp the lower knife guard rigidly to the support bar.

Preferably the compressible resilient pad includes a portion thereof surrounding the nut so that it has a counterbore portion to receive the nut.

Preferably the knife engaging element of the upper knife guard includes a substantially flat bottom surface lying on top of a substantially flat top surface of the lower knife guard with at least one blade of the knife arrangement passing therebetween.

The adjustment screw is located behind the transverse line with the bar of the pad in front of the line since there would otherwise be a tendency for the resilient material to give way when the knife lifting loads increase in heavy cutting situations or at blockages.

According to a second aspect of the invention there is provided a crop cutting apparatus comprising:

a forwardly facing horizontal support bar carried for movement across the ground in a forward movement for cutting a standing crop;

a horizontally reciprocal knife arrangement including a plurality of blades thereon;

a plurality of upper knife guards and a corresponding plurality of lower knife guards arranged in cooperating pairs and mounted above and below the support bar respectively;

each pair of upper and lower knife guards including at least two knife engaging element extending forwardly from the support bar so that each knife engaging element of the upper knife guard overlies a corresponding knife engaging element of the lower knife guard to define a channel therebetween across the front of the support bar in which the knife arrangement reciprocates;

the lower knife guards being clamped to an under surface of the support bar;

the upper knife guards being attached to an upper surface of the support bar by:
  a compressible resilient pad between an under surface of the upper knife guard and the upper surface of the support bar;
  two hold down screw fasteners spaced along a transverse line along the support bar engaged between the upper knife guard and the support bar which hold the upper knife guard on to the resilient pad;

and at least one adjustment screw engaged between the upper knife guard and the support bar rearwardly of the transverse line of the hold down screw fasteners;

the adjustment screw being adjustable to change the spacing between the under surface of the upper knife guard and the support bar at the adjustment screw so as to change the spacing between the under surface of the upper knife guard and the support bar on a side of the transverse line opposite to the adjustment screw by increasing or decreasing an amount of compression of the compressible resilient pad. This acts to vary the clearance for the knife sections between the lower guard and the upper hold down/guide.

The arrangement as described herein is easier to adjust that the previous arrangement shown in the above patent since there are only three screw and nut type fasteners to adjust in the new version as opposed to the previous version.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
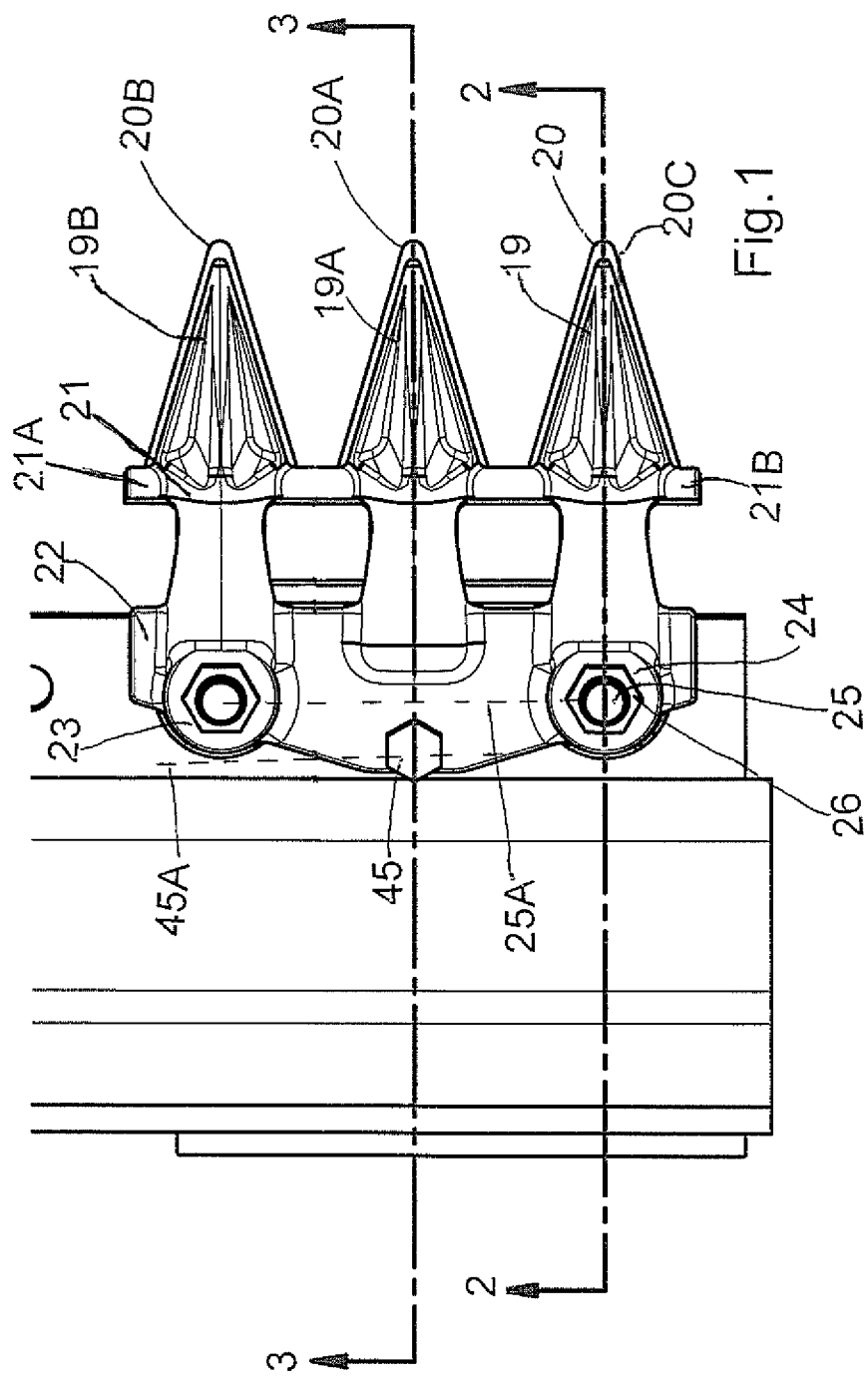
FIG. 1 is a top plan view showing the cutter bar, guard bar and one guard of a crop harvesting machine according to the present invention.
Figure 2:
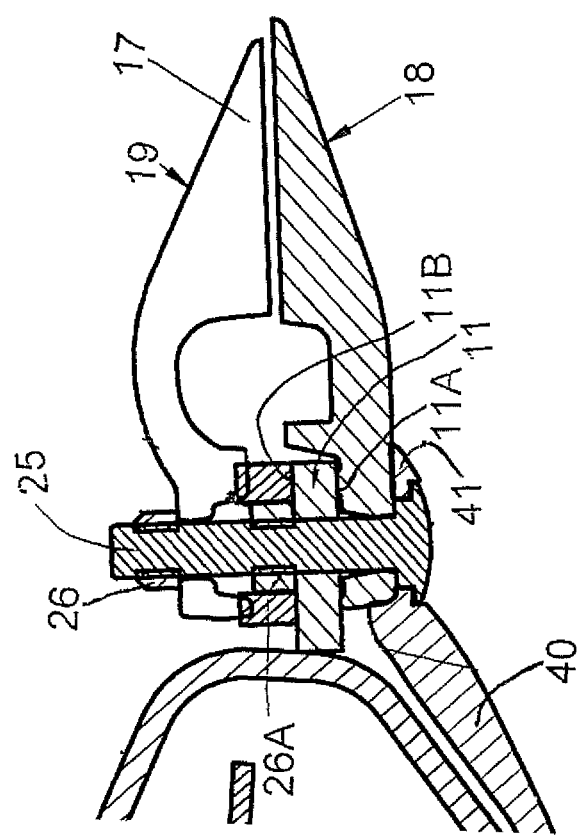
FIG. 2 is a cross sectional view along the lines 2-2 of FIG. 1.

The crop cutting apparatus shown in FIGS. 1 and 2 comprises a frame member 10 only a part of which is shown since this is of conventional construction. The attachment of the frame to suitable ground wheels and a suitable traction unit are not shown as these are of a conventional nature and are not involved in the present invention. The frame 10 carries a support flange or support bar 11 which projects forwardly from the frame and extends in a horizontal plane across a front surface of the frame. The flange or support bar is shown attached by weld lines 12 but this is one example only of the mounting techniques since the flange itself is again of a conventional structure. The flange extends along substantially the full width of the frame so as to carry the sickle knife described in more detail hereinafter.

As well known by one skilled in the art, the support bar 11 carries a plurality of stub guards or knife guards, arranged in side by side relation across the full length of the support bar. The stub guards act to support and guide a knife arrangement generally indicated at 13 in FIG. 3 which includes a knife bar 14 and a plurality of generally triangular blades 15 attached to the bar by rivets. Again the knife arrangement is of conventional construction and is driven by a suitable reciprocating drive mechanism (not shown) at one end or both ends of the knife arrangement so as to move the bar in a reciprocating action along its length to drive the triangular blades back and forth across the guards in a cutting action. The knife is omitted from FIGS. 1, 2 and 4 for convenience of illustration and to show the knife guards more clearly.

The single stub guard assembly shown in the Figures comprises a cooperating pair of guards including an upper stub guard 17 and a lower stub guard 18.

As shown in plan the upper stub guard 17 comprises a plurality of forwardly projecting fingers 19 which are interconnected by two transverse coupling bars 21 and 22. Three fingers are shown but similar arrangements can have one finger or two fingers. At a rearward end of the fingers 19 there is provided a pair of circular boss portions 23 and 24 which can receive a carriage bolt 25 and cooperating nuts 26 and 26A by which the upper and lower stub guards are clamped onto the flange 11.

The lower stub guard 18 is of a similar shape to that of the upper stub guard and includes a corresponding plurality of forwardly projecting fingers 20, 20A and 20B which are interconnected by two transverse coupling bars and lie underneath the fingers 19. At a rearward end of the fingers 20 there is provided a pair of a circular boss portions which receive the carriage bolt 25. The fingers 20 are slightly smaller, as shown in the plan view projection, in upper surface area 20C than the bottom surface 21C of the fingers 19.

The bar 21 projects outwardly from the sides of the fingers 19 and 20 and defines stub bar portions 21A and 21B which cooperate with the similar portions of the next adjacent stub guards to define a continuous surface along which the knife arrangement can slide.

Figure 3:
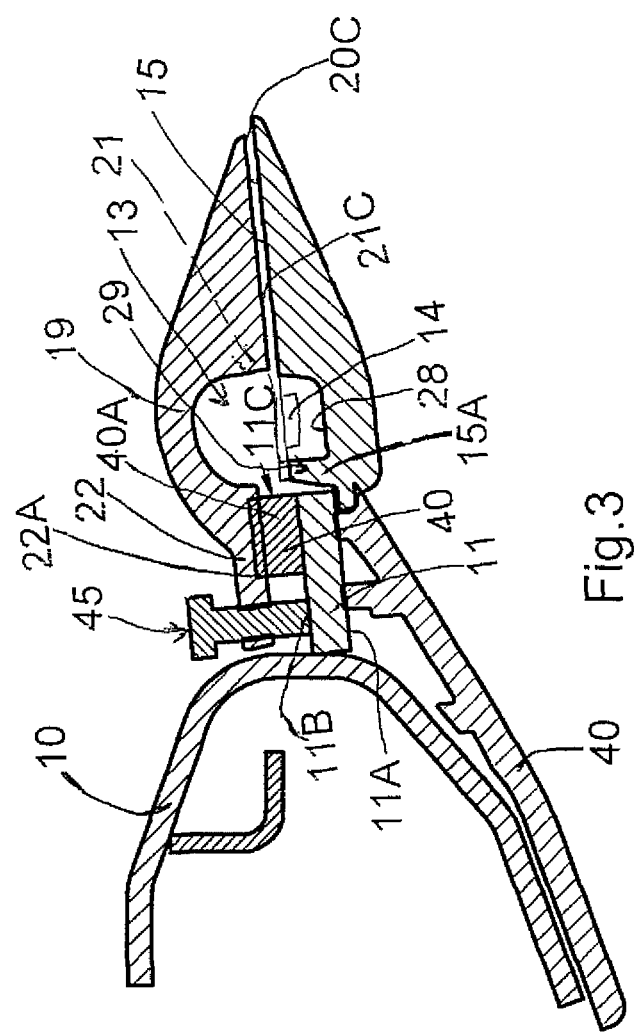
FIG. 3 is a cross sectional view along the lines 3-3 of FIG. 1.

As best shown in FIG. 3 the stub guards are shaped in side elevation to define planar surfaces 21C at a forward end of the fingers and underneath the coupling bar 21 with the edges of the planar surfaces being machined to cooperate with the knife blades 15. Rearwardly of the planar surfaces is defined an open area 28 within which the bar 14 moves. A rearmost edge of the knife blades as indicated at 15A runs over a rear wear surface 29 of each of the stub guards so the knife arrangement is confined in its sliding action by the channel defined between the upper and lower stub guards. Typically there is a slight clearance between the upper surfaces of the blades 15 of the knife arrangement and the bottom surface 21C of the stub guards but this clearance must of course be adjusted to a required tolerance to ensure that the knife arrangement is properly guided while no excessive friction is applied to the sliding action of the knife arrangement.

A series of wear shields 40 are arranged side by side across the cutter bar so as to provide a wear surface underneath the guard bar 11 and the guards 18.

The wear shields 40 in the embodiment shown are arranged so that they have a width generally equal to the width of an associated guard. However wear shields of a greater width can be manufactured so as to co-operate with a series of the guards. The single shield for each guard is selected for easier mounting since the wear shield can be removed and replaced simply by removing and replacing the associated one of the guards. Each wear shield 40 has a front mounting portion 41 and a rear covering portion 42. The front mounting portion 41 is arranged to be mounted at the guard plate. The rear covering portion extends rearwardly from a front edge 43 of the rear covering portion rearwardly and downwardly over the bottom plate 30 to a rear edge 44 of the rear covering portion.

Thus each pair of upper and lower knife guards 17, 18 includes at least one knife engaging element defined by the fingers 19, 20 extending forwardly from the support bar 11 so that the or each knife engaging element 19 of the upper knife guard overlies a corresponding knife engaging element 20 of the lower knife guard to define a channel therebetween across the front of the support bar in which the blades 15 of the knife arrangement reciprocates. The lower knife guards 18 are clamped to an under surface 11A of the support bar 11 by the bolt 25 which cooperates with the nut 26A on the top surface 11B of the bar 11.

The above features of the device are generally conventional and are described herein for completeness. The invention relates to the adjustment and positioning of the knife guards relative to the flange 11 which will now be described.

In the arrangement of the present invention, the upper knife guards 17 are attached to the upper surface of the support bar in a manner which provides an effective and rapid adjustment of the position of the surface 21C relative to the surface 20C to adjust the spacing therebetween through which the blades 15 move.

The arrangement includes the hold down screw fasteners 25 engaged between the upper knife guard 17 and the support bar 11 which cooperates with the upper nut 26 to hold down the upper knife guard. The two screw fasteners 25 lie on a line 25A longitudinal of the bar 11 and transverse to the length of the guards 17.

Figure 4:
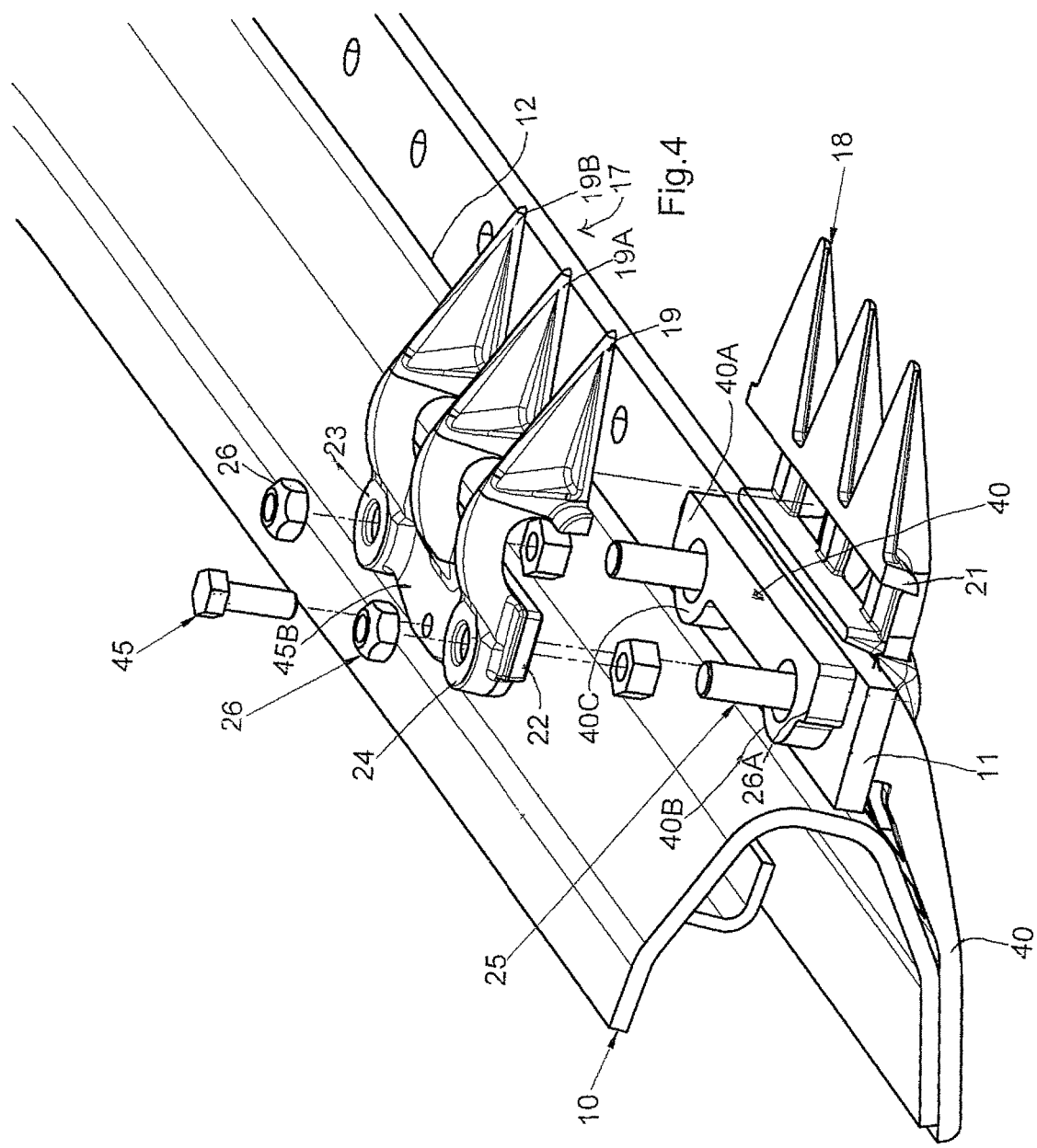
FIG. 4 is an isometric view from the top and one side of the apparatus of FIG. 1.

A compressible resilient pad 40 best shown in FIG. 4 is located between an under surface of the upper knife guard 17 at the bar 22 and the upper surface 11B of the support bar 11.

An adjustment screw 45 is engaged between the upper knife guard 17 and the support bar 11 on a transverse line 45A different from and behind the transverse line 25A of the hold down screw fasteners 25.

The adjustment screw is adjustable to change the spacing between the under surface 22A of the upper knife guard and the upper surface 11B of the support bar 11 at the adjustment screw 45 so as to change the spacing between the under surface of the upper knife guard and the support bar 11 at a side of the transverse line 25A opposite to the adjustment screw 45. This is done by increasing or decreasing an amount of compression of the compressible resilient pad as the upper guard 17 pivots about the line 25A forming a fulcrum defined by the fasteners 25.

Thus, typically as the knife blades 15 wear and become thinner, it is necessary to decrease the spacing at the blades to maintain a required clearance between the blade and the surface 21C. The is obtained by adjusting the threaded screw 45 in a threaded hole 45B at the line 45A so as to push down to a greater extent on the upper surface 11b and thus tilt the front part of the guard 17 downwardly by increasing compression on the pad 40.

The compressible resilient pad 40 includes a bar 40A extending along the support bar on the side of the transverse line 25A opposite to the adjustment screw 45. This bar 40A of resilient material thus supports the underside of the transverse bar 22 and fills the area between the line 25A and the front edge 11C of the bar 11. The compressible resilient pad 40 includes two ring portions 40B and 40C thereof surrounding the hold down screw fasteners 25. Thus the compressible resilient pad is spaced from the adjustment screw leaving the area on the side of the line 25A substantially free of the resilient material apart from the ring portions 40B and 40C which hold the pad in place on the bar 11. The compressible resilient pad 40 therefore has less material on the side of the transverse line 25A at the adjustment screw 45 than on the opposite side where it is required to support the upper guard. The compressible resilient pad thus consists substantially of the bar 45A and the portions 45B and 45C.

The pad is formed of a suitable compressible rubber material which can be compressed by application of pressure from the screw 45. It is sufficiently resistant to compression however to hold the upper guard 17 in its fixed position without vibration or without lifting under loads from the knife. A suitable material is natural rubber or neoprene, but other materials can be used.

The hold down screw fasteners 25 includes the nuts 26A on top of the support bar to clamp the lower knife guard to the support bar. The compressible resilient pad includes the portions 45B and 45C thereof surrounding the nut which are counter-bored to receive the nuts.

In the embodiment shown, the adjustment screw 45 is located behind the transverse line 25A and the bar 40A in front of that line. This arrangement can be reversed.

The adjustment procedure is as follows. In a new assembly, preferably the jack screw 45 is previously adjusted to a preset value for ease of assembly. The hold down nut fastener for the upper guard 17 is then be secured in place by tightening the two upper nuts 26, which squeeze the elastomeric pad until the hold down guard 17 is in an ideal location for the cutting conditions at hand.

Once the new assembly is adjusted to new knife, subsequent adjustments (required by knife wear) are relatively easy, simply by adjusting the rear jack screw 45.

The arrangement is shown in a preferred arrangement where the elastomeric pad 40 is used to hold the tip of the hold down 17 at a preferred clearance above knife section. The hold down 17 in this arrangement is then rigidly mounted and prevented from moving away from section by upper nuts 26 and bolt 25 and the jack screw item 45.

The arrangements herein currently show a three point guard but the invention is not limited to such and single or double guards can be used.

The invention claimed is:

1. A crop cutting apparatus comprising:
   a forwardly facing support bar extending across a width of the apparatus carried for movement across the ground in a forward movement for cutting a standing crop, the support bar having an upper surface and a lower surface;
   a knife arrangement for reciprocating movement along the support bar including a plurality of blades thereon;
   a plurality of upper knife guards and a corresponding plurality of lower knife guards arranged in cooperating pairs and mounted above and below the support bar respectively;
   each pair of upper and lower knife guards including at least two fingers extending forwardly from the support bar so that each finger of the upper knife guard overlies a corresponding finger of the lower knife guard to define a channel therebetween across the front of the support bar in which the knife arrangement reciprocates, a width of the channel between the fingers of the upper knife guard and the lower knife guard being adjustable;
   each of the plurality of upper knife guards comprising a transverse bar holding said at least two fingers thereof as a rigid integral structure for common adjustment movement;
   each of said plurality of lower knife guards being clamped to said lower surface of the support bar by a respective pair of hold down screw fasteners spaced longitudinally of the support bar and lying on a transverse line along the support bar;
   a compressible resilient pad located between an under surface of the respective one of the plurality of upper knife guards and the upper surface of the support bar;
   said respective pair of hold down screw fasteners passing through the respective one of said plurality of lower knife guards, through the support bar and through the respective one of said plurality of upper knife guards to clamp the respective one of the plurality of lower knife guards to the lower surface of the support bar and to apply forces pulling the respective one of the plurality of upper knife guards toward the upper surface of the support bar and apply forces in a direction to apply compression to the compressible resilient pad located between the under surface of the respective one of the plurality of upper knife guards and the upper surface of the support bar;

and at least one adjustment screw engaged between said respective one of the plurality of upper knife guards and the support bar on a rearward side of the transverse line opposite to said forwardly extending fingers;

said at least one adjustment screw being adjustable to change the spacing between the under surface of the respective one of the plurality of upper knife guards and the support bar at said at least one adjustment screw so as to adjust the width of the channel on a side of the transverse line opposite to the adjustment screw by increasing or decreasing an amount of compression of the compressible resilient pad;

wherein the compressible resilient pad includes a bar extending along the support bar on the side of the transverse line opposite to the adjustment screw;

and wherein the bar of the compressible resilient pad terminates at the transverse line.

2. The apparatus according to claim 1 wherein the compressible resilient pad includes two portions thereof each surrounding a respective one of pair of hold down screw fasteners.

3. The apparatus according to claim 1 wherein said pair of hold down screw fasteners each include a nut on top of the respective one of the plurality of upper knife guards.

* * * * *